L. S. LACHMAN.
ELECTRIC WELDING APPARATUS.
APPLICATION FILED JAN. 19, 1916.
1,237,915.
Patented Aug. 21, 1917.
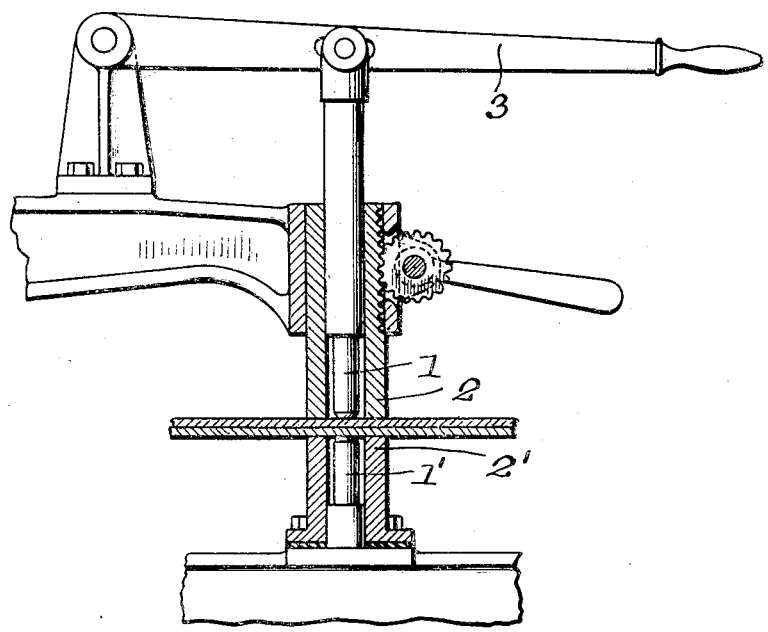
INVENTOR
Laurence S. Lachman.
BY
Townsend & Decker
ATTORNEYS

UNITED STATES PATENT OFFICE.

LAURENCE S. LACHMAN, OF NEW YORK, N. Y., ASSIGNOR, BY MESNE ASSIGNMENTS, TO THOMSON SPOT WELDER COMPANY, OF BOSTON, MASSACHUSETTS, A CORPORATION OF MASSACHUSETTS.

ELECTRIC WELDING APPARATUS.

1,237,915.  Specification of Letters Patent.  Patented Aug. 21, 1917.

Application filed January 19, 1916. Serial No. 72,911.

*To all whom it may concern:*

Be it known that I, LAURENCE S. LACHMAN, a citizen of the United States, and a resident of New York, in the county of New York and State of New York, have invented certain new and useful Improvements in Electric Welding Apparatus, of which the following is a specification.

My invention relates to apparatus for making electric welds known as spot welds in superposed sheets or plates of metal at any desired point in the surface thereof.

The object of the invention is to provide means to prevent creeping of the plates when the welding is done consecutively at separate points in the surface of the metal sheets, as likewise to avoid difficulties due to the presence of buckles or irregularities in the surface of the metal, and further to provide means whereby very heavy plates or sheets may be effectively welded together at any points or spots in their meeting surfaces.

To this end the invention consists in the combination with the spot welding electrode or electrodes of an auxiliary electrically inactive pressure device comprising a ring or cylinder surrounding the welding electrode and provided with means whereby it may be operated to compress the metal sheets in a zone immediately surrounding the zone of welding to be done by the welding electrode or electrodes.

In the accompanying drawings I have shown an apparatus embodying my invention in vertical central section with two sheets or plates of metal inserted in the machine for welding at a spot in their meeting surfaces.

1 indicates the welding electrode operable by any desired means, as for instance by a lever 3 and supplied with welding current from any source for the purpose of applying heating current to the spot or point of welding, as well as pressure for effecting the weld. A coöperating opposite electrode of similar form or of any desired nature is shown at 1'. Said electrodes 1 and 1' are the poles of the circuit furnishing the heating current and may, as usual in the art, be the terminals of a secondary of a transformer. Surrounding the upper electrode is a ring or cylinder 2 adapted to be brought into engagement with the sheet or plate of metal being welded for the purpose of applying pressure to any desired extent and so as to bring the plates into contact with one another at and near the point of welding. Said auxiliary pressure ring or cylinder 2 is usually preferably insulated entirely from the welding electrode 1 but is placed as close thereto as possible without being in actual electrical contact therewith. The pressure device 2 may be operated by rack and pinion, as indicated, or by any other mechanical appliance adapting it to be reciprocated into and out of engagement with the work. The coöperating pressure device arranged at the opposite side of the work and rigidly fixed in position is indicated at 2'.

In the operation of the apparatus the work is brought to the desired position between the two members of the machine described and the pressure device 2 is brought down against the work by operation of the pinion shown, or other appliance, and presses the two sheets or plates firmly together, thereby not only preventing any tendency of the same to creep during the welding operation, but also insuring good contact between their meeting surfaces at the point of weld.

The device is particularly useful in the welding of very heavy plates or sheets since, if dependence be placed upon the welding electrodes for the very heavy pressure required with such class of work, there is a tendency to upset or deform the said welding electrodes, which are usually made of some metal of good conductivity which, being a comparatively soft metal, is more liable to become deformed if dependence is placed on the electrodes to get the plates together at the point of weld. Furthermore, when the plates are brought into contact by the use of the electrodes themselves with the necessary pressure to prevent creeping, it is necessary to employ a heavy current in order to bring the metal to be welded up to the necessary welding temperature owing to the fact that the pressure in the line of the flow of current brings them into such intimate contact that the resistance in such line is greatly decreased.

In the operation of the device the pressure ring or cylinder 2 may be brought down against the work either simultaneously with the welding electrode or independently thereof prior to the application of the welding electrode to the work.

What I claim as my invention is:—

1. In an electric spot welding machine, the combination with a welding electrode, of a surrounding pressure ring or cylinder insulated from said electrode and disconnected from the source of heating current and adapted to surround the welding electrode and to engage the work around the zone of welding, means for reciprocating said cylinder in a line parallel with the electrode and independent means for operating the electrode.

2. The combination in an electric welding machine, of a welding electrode, a surrounding electrically inactive pressure device, means for reciprocating the welding electrode and independent means for reciprocating the surrounding pressure device.

Signed at New York in the county of New York and State of New York this 6th day of October A. D. 1915.

LAURENCE S. LACHMAN.

Witnesses:
    F. B. TOWNSEND,
    REMINGTON SCOTT.